United States Patent
Schubert et al.

(10) Patent No.: US 10,386,463 B1
(45) Date of Patent: Aug. 20, 2019

(54) RETROREFLECTOR WITH WAVELENGTH-DEPENDENT RESPONSE TO CONVEY POSE INFORMATION

(71) Applicant: X Development LLC, Mountain View, CA (US)

(72) Inventors: Martin Friedrich Schubert, Mountain View, CA (US); Michael Jason Grundmann, San Jose, CA (US)

(73) Assignee: X Development LLC, Mountain View, CA (US)

( * ) Notice: Subject to any disclaimer, the term of this patent is extended or adjusted under 35 U.S.C. 154(b) by 357 days.

(21) Appl. No.: 15/393,796

(22) Filed: Dec. 29, 2016

(51) Int. Cl.
| | |
|---|---|
| *G02B 5/28* | (2006.01) |
| *G01S 17/42* | (2006.01) |
| *G01S 17/66* | (2006.01) |
| *G01S 7/481* | (2006.01) |
| *G02B 5/122* | (2006.01) |
| *G01S 17/89* | (2006.01) |

(52) U.S. Cl.
CPC .............. *G01S 7/481* (2013.01); *G01S 17/42* (2013.01); *G01S 17/66* (2013.01); *G01S 17/89* (2013.01); *G02B 5/122* (2013.01); *G02B 5/28* (2013.01)

(58) Field of Classification Search
CPC .......... G01S 7/481; G01S 17/42; G01S 17/66; G01S 17/88; G01S 17/89; G02B 5/12; G02B 5/122; G02B 5/124
See application file for complete search history.

(56) References Cited

U.S. PATENT DOCUMENTS

| | | | |
|---|---|---|---|
| 2004/0246583 A1 | 12/2004 | Mueller et al. | |
| 2005/0163511 A1* | 7/2005 | Cicchiello | G01S 7/481 398/170 |
| 2008/0218728 A1* | 9/2008 | Kirschner | G01C 15/00 356/4.01 |
| 2009/0078858 A1 | 3/2009 | Fouquet et al. | |
| 2015/0377605 A1* | 12/2015 | Bridges | G06T 7/73 382/106 |
| 2018/0136364 A1* | 5/2018 | Kare | G01S 17/026 |
| 2018/0216915 A1* | 8/2018 | Keller | F41G 3/06 |

FOREIGN PATENT DOCUMENTS

WO     2011/051723     5/2011

* cited by examiner

*Primary Examiner* — Eric L Bolda
(74) *Attorney, Agent, or Firm* — Fish & Richardson P.C.

(57) ABSTRACT

A system includes: a light source; a detector configured to spectrally resolve light across an operative wavelength range; a retroreflector module including a reflector and an optical filter integrated with the reflector, the reflector being configured to retroreflect at least some of incident light across the operative wavelength range; an optical filter configured to filter light across the operative wavelength range, the optical filter having an angular-dependent optical characteristic for light across the operative wavelength range; and an electronic processing module in communication with the detector. The system is configured so that during operation the light source directs broadband light towards the retroreflector module, the detector detects filtered retroreflected light from the retroreflection module, and the electronic processing module determines information about an orientation of the retroreflector module with respect to the detector based on the spectral content of the filtered retroreflected light.

23 Claims, 6 Drawing Sheets

RETROREFLECTOR WITH WAVELENGTH-DEPENDENT RESPONSE TO CONVEY POSE INFORMATION

TECHNICAL FIELD

This disclosure generally relates to the use of retroreflectors for optical tracking.

BACKGROUND

Retroreflectors, e.g., cube corner reflectors, are optical devices which reflect light back along the path from which it came. Optical tracking systems use retroreflectors to locate objects of interest. For example, a retroreflector can be affixed to the object of interest, which moves around within a frame of reference and is illuminated by a light source. Due to its retroreflective nature, the retroreflector returns light to the source, where it can be detected and located within the reference frame. However, in general, the retroreflected light contains no information about how the retroreflector (and correspondingly, the object of interest) is oriented in the reference frame.

SUMMARY

This disclosure features using an optical filter to encode retroreflected light with spectral information indicative of the retroreflectors pose. Specifically, an optical filter whose spectral response depends on the angle of light incidence is attached to a retroreflector in the path of retroflected light. For example, an optical filter composed of a dielectric stack of layers may feature a strong reflectance centered at a particular wavelength for normally incident light, but this peak shifts to shorter wavelengths as the angle of incident light becomes more oblique. Similarly, a distributed Bragg reflector with a defect will feature a transmission peak that shifts to shorter wavelengths as the angle of light incidence increases. By detecting and spectrally resolving broadband light reflected from the retroreflector and filtered through the optical filter, one can correlate the reflectance peak (or trough) wavelength from the optical filter to an orientation of the retroreflector with respect to the light source/detector.

Implementations can be used in applications involving optical localization of a movable body where information about the body's pose is important. Examples include optical tracking of person, e.g., for VR or gaming applications, and robotic applications requiring automated positioning of one body relative to another, e.g., precision interconnects or parts assembly.

In general, in a first aspect, the invention features a system that includes: a light source; a detector configured to spectrally resolve light across an operative wavelength range; a retroreflector module including a reflector and an optical filter integrated with the reflector, the reflector being configured to retroreflect at least some of incident light across the operative wavelength range; an optical filter configured to filter light across the operative wavelength range, the optical filter having an angular-dependent optical characteristic for light across the operative wavelength range; and an electronic processing module in communication with the detector. The system is configured so that during operation the light source directs broadband light towards the retroreflector module, the detector detects filtered retroreflected light from the retroreflection module, and the electronic processing module determines information about an orientation of the retroreflector module with respect to the detector based on the spectral content of the filtered retroreflected light.

Embodiments of the system can include one or more of the following features. For example, the electronic processing module can be configured to determine information about the orientation of the retroreflector module based on a wavelength of peak or valley in the spectrum of the filtered retroreflected light.

The information about the orientation of the retroreflector module can include information about at least one orientational degree of freedom of the retroreflector module with respect to the detector.

The electronic processing module can be configured to determine information about the location of the retroreflector module with respect to the detector based on the filtered retroreflected light. The information about the location of the retroreflector module with respect to the detector can include a direction of the retroreflector module with respect to the detector. The information about the location of the retroreflector module with respect to the detector can include a distance of the retroreflector module with respect to the detector.

In some embodiments, the optical filter includes an interference filter. For example, the interference filter can transmit or reflect a narrow band of the broadband light. The interference filter can include a plurality of layers of dielectric materials where adjacent layers have differing indexes of refraction.

The reflector can be a cube corner retroreflector. The optical filter can be integrated with the cube corner to substantially cover an aperture of the cube corner. In some embodiments, the optical filter is integrated with the cube corner to form a reflective surface of the cube corner. The optical filter can be a first optical filter and at least one additional optical filter is integrated with the cube corner to form a second reflective surface of the cube corner, the additional optical filter having different spectral characteristics than the first optical filter.

In some embodiments, the optical filter is a first optical filter, the retroreflector module includes at least one additional optical filter integrated with the reflector and having a different spectral characteristic from the first optical filter, and the electronic processing module is configured to determine information about a first degree of freedom from the first optical filter and to determine information about a second degree of freedom, different from the first degree of freedom, based on the additional optical filter.

The reflector can be a diffuse reflector.

The light source can be a visible light source. For example, the light source can be a white light source.

The system can include one or more additional retroreflector modules each including a reflector and an optical filter integrated with the corresponding reflector, the reflector being configured to retroreflect at least some of incident light across the operative wavelength range, each of the one or more retroreflector modules including an optical filter configured to filter light across the operative wavelength range, each optical filter having an angular-dependent optical characteristic for light across the operative wavelength range, wherein each optical filter has a spectral filtering characteristic different from optical filters of the other retroreflector modules. The electronic processing module can be configured to distinguish each retroreflector module based on the spectral filtering characteristic of each corresponding optical filter.

In general, in a further aspect, the invention features a method for determining pose information about a reflective object with respect to a frame of reference, the method including: illuminating the reflective object with broadband illumination; detecting retroreflected light from the reflective object in response to the illuminating, wherein the reflective object comprises an optical filter which spectrally encodes the retroreflected light with information about an orientation of the reflective information with respect to at least one degree of freedom in the frame of reference; and determining pose information relating to the at least one degree of information based on a spectrum of the detected retroreflected light.

Implementations of the method can include one or more of the following features. For example, the optical filter spectrally can encode the retroreflected light by transmitting or reflecting a band of wavelengths that is a subset of spectrum of the broadband illumination. A peak wavelength of the band of wavelengths can depend on an incidence angle of light on the optical filter and the pose information is determined based on a value of the peak wavelength.

Among other advantages, the disclosed systems and methods provide a simple way to determine pose information about a retroreflective object using a single light source and detector. For example, because the retroreflecting objects spectrally encode retroreflected broadband light with pose information, a single measurement using broadband light source and a single detector is all that is needed to obtain pose information. Moreover, the disclosed systems can provide pose information from an retroreflective object that is purely passive. In other words, the retroreflective object does not include any elements that require a power source, such as a light emitting device (e.g., LED). In contrast, conventional solutions that use a single source and a single detector don't ordinarily include this additional information. Generally, such systems require additional components, e.g., a retroreflector can be augmented with an array of LEDs, where imaging the LEDs provides pose information.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
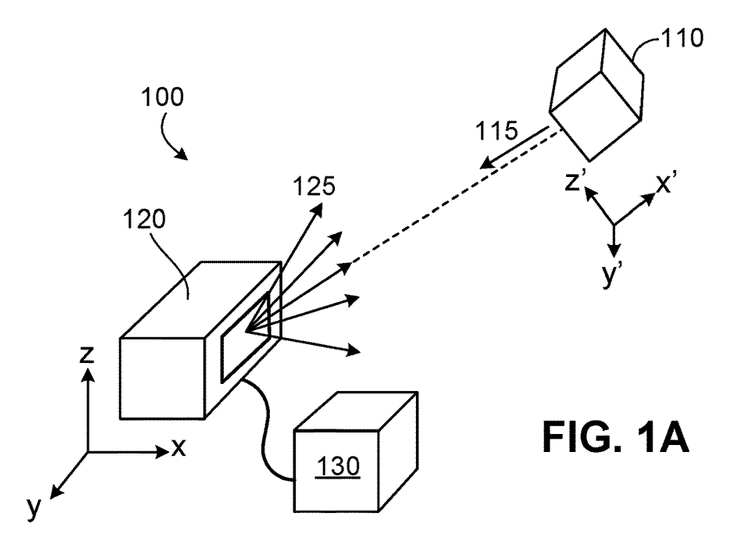
FIG. 1A is a schematic diagram of an embodiment of an optical tracking system utilizing a retroreflector module.

Referring to FIG. 1A, an optical tracking system 100 includes a source/detector module 120 in communication with an electronic processing module 130, which together track the location and pose of a retroreflector module 110 with a frame of reference depicted by a Cartesian coordinate system XYZ. Retroreflector module 110 includes a retroreflecting optical element which retroreflects at least some incident light and an optical filter which spectrally filters the retroreflected light. The optical filter is integrated with the retroreflecting optical element so that any positional or orientational changes of the retroreflecting optical element similarly change the orientation of the optical filter. Source/detector module 120 includes a broadband light source that emits light 125 into the system's environment. At least some of this light is emitted in the direction of retroreflector module 110, which retroreflects a portion of the incident light back towards source/detector module 120 along the path from which it came. The retroreflected light is depicted by arrow 115 in FIG. 1A. Module 120 includes a detector which detects the retroreflected light and sends corresponding signals to electronic processing module 130 from which the electronic processing module determines information about the location of retroreflector module 110 in the XYZ frame of reference based on the direction of the detected light.

Retroreflector module 110 also provides information about its pose by spectrally encoding pose information into retroreflected light 115. The spectral encoding of pose information is performed by the optical filter. In particular, the spectral filtering characteristics of the optical filter vary depending on the angle of incidence of incident light. In other words, the wavelengths at which the optical filter reflects or transmits light vary depending on the angle of incidence of the incident light (this principle is discussed in more detail below). Pose information refers to the orientation of retroreflector module 110 in the XYZ reference frame. This is illustrated in FIG. 1A by the orientation of a Cartesian coordinate system X'Y'Z' representative of the retroreflector module orientation, whose axes are not (necessarily) aligned with the axes of the XYZ reference frame. Accordingly, electronic processing module 130 also determines information about the pose of retroreflector module based on the signals the electronic processing module receives from source/detector module 120.

Figure 1B:
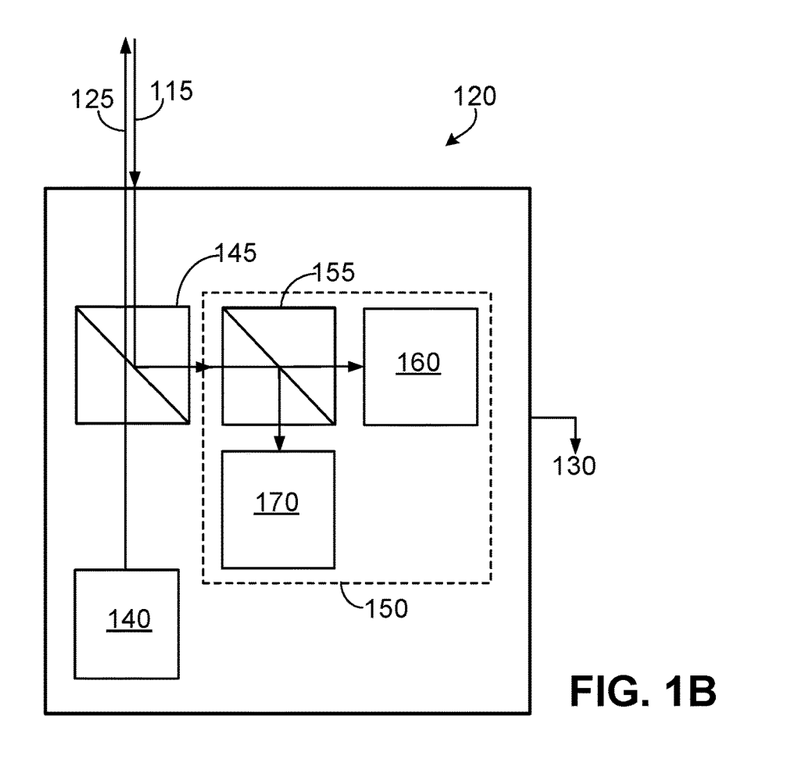
FIG. 1B is a schematic diagram of an embodiment of a source/detector module.

Referring also to FIG. 1B, source/detector module 120 includes a broadband light source 140 and a detector 150. In order to provide illumination (ray 125) and receive retroreflected light (ray 115), module 120 includes a beam splitter 145. During operation, beam splitter 145 transmits (at least some of the) light emitted from light source 140 and reflects (at least some of the) light received from the retroreflector module towards detector 150.

Here, broadband light refers to light that includes sufficient energy at each wavelength across a range of wavelengths at which the optical filter operates such that light at each wavelength retroreflected back to the detector has sufficient intensity to be unambiguously detected. In some implementations, the broadband light source emits white light (light with energy at all wavelengths across the visible spectrum). Alternatively, in some embodiments, the light source emits light in just a band of visible wavelengths. Non-visible light can also be used. For example, broadband infrared light can be used. Suitable broadband light sources include phosphor-based light emitting diodes (LEDs), such as source composed of a blue-light emitting LED (e.g., InGaN LED) with a phosphor material for converting some of the blue light from the LED to yellow light. Alternatively, an array of different colored LEDs can be used to provide broadband light. Other suitable broadband sources include fluorescent bulbs and incandescent bulbs, for example.

In general, the light can be dispersed into the system's environment by simultaneous emission into a broad range of solid angles. In some embodiments, module 120 can include optical elements, such as one or more lenses or diffusers, for shaping the emission from source 140 to provide the desired emission profile. In some implementations, for example where retroreflector module 110 is confined to a relatively small area, a more focused emission profile can be used.

Alternatively, or additionally, in some embodiments the light source can sequentially scan the light into different angular ranges. For example, module 120 can include a mirror galvanometer for directing light ray 125 into different directions. Detector 150 includes two separate sensors: a first sensor 160 and a second sensor 170. Detector 150 also includes a beam splitter which splits incoming light from beam splitter 145, directing a portion of the incoming light to second sensor 170 while transmitting the remaining incoming light to first sensor 160.

Sensor 160 is a position sensitive sensor from which system 100 determines the location of retroreflector module 110 in the XYZ reference frame from the retroreflected light 115. For example, sensor 160 can be a pixelated sensor array (e.g., a CMOS or CCD array) arranged so that the location of the retroreflected light on the sensor array correlates to the direction along which the retroreflected light is received. In some embodiments, sensor 160 includes one or more optical elements to facilitate the mapping of the direction of incoming light to unique locations on the sensor array. The distance of retroreflector module 110 along the retroreflection direction can be determined by, e.g., time-of-flight or other ranging techniques.

Sensor 170 is a spectrally resolving sensor configured to measure the spectrum incident light. For example, sensor 170 can include a dispersing element, such as a grating, and a sensor array arranged so that the location of the light on the array correlates to its wavelength. In some embodiments, sensor 170 is also a spatially resolving sensor. Providing spatial and spectral resolution can allow the system to correlate each spectrum to a different reflector.

While the source/detector module depicted in FIG. 1B is configured such that the emitted and received light propagate along precisely overlapping paths, other configurations are also possible. For example, in some embodiments the detector and source can be positioned close together without sharing common optical elements. In such cases, the retroflecting optical element in retroreflector module 110 can be selected so that retroreflected light diverges slights from the same path as the incident light. Cube corners with dihedral angle errors, for example, will provide some divergence of a retroreflected beam from incident light. In such cases, the source/detector module need not include components (e.g., beam splitters) that separate outgoing light from incoming light. The source and detector components can be positioned next to each other, such that similar but non-overlapping light paths are utilized.

In some implementations, systems can include two (or more) source/detector modules both arranged to direct light to and receive light from the retroreflector module and both in communication with the electronic processing module. Two source/detector modules allows the system to determine the retroreflector module's pose with respect to two locations and, in addition, to determine the distance to from the source/detector modules to the retroreflector module by triangulation of the directions from which the detected light is received (assuming the relative location of the two source/detector modules is known).

Moreover, while detector 150 includes two separate sensors as described above, in some embodiments a single sensor can be used to determine both location and spectral information. For instance, in some cases, a convention RGB color sensor can be used. Alternatively, a hyperspectral camera can be used.

In some embodiments, the light source is pulsed and the detector(s) operated in a lock-in mode. Such lock-in configurations can improve signal-to-noise ratio, especially in environments where the detector is exposed to significant stray light.

Furthermore, while the light source and detector are described as being part of a common module in the foregoing description, it is not necessary that the source and detector be provided in a common physical housing. More generally, the source and detector can be provided separately, provided they are spatially arranged sufficiently close to one another so that the detector detects light from the source that is retroreflected by the retroreflecting module.

As noted above, retroreflector module 110 includes an optical filter which spectrally encodes retroreflected light with pose information. For example, the optical filter can be in the form of a dielectric mirror for which the spectral transmission and reflection properties vary as a function of incident angle of the light on the mirror.

A dielectric mirror, also known as a Bragg mirror, is a type of mirror composed of multiple thin layers of dielectric material, typically deposited on a substrate of glass or some other optical material. By careful choice of the type and thickness of the dielectric layers, one can design an optical coating with specified reflectivity at different wavelengths of light. Dielectric mirrors can be highly reflective mirrors (e.g., reflecting over 99% of incident light) over a narrow range of wavelengths (e.g., over a band of 5 nm, 10 nm, 15 nm, up to 20 nm). Alternatively, they can be made to reflect a broad spectrum of light (e.g., over 50 nm or more, 75 nm or more, 100 nm or more).

Dielectric mirrors function based on the interference of light reflected from the different layers of dielectric stack. Simple dielectric mirrors function like one-dimensional photonic crystals, consisting of a stack of layers with a first refractive index interleaved with layers of a second, different refractive index. The thicknesses of the layers are chosen such that the path-length differences for reflections from different high-index layers are integer multiples of the wavelength for which the mirror is designed. The reflections from the low-index layers have exactly half a wavelength in path length difference, but there is a 180-degree difference in phase shift at a low-to-high index boundary, compared to a high-to-low index boundary, which means that these reflections are also in phase for a specific wavelength.

Figure 2A:
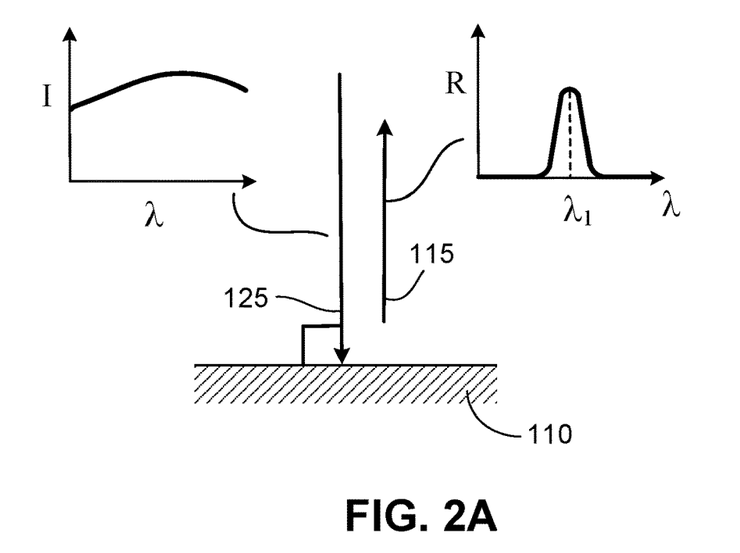
FIG. 2A depicts the spectral response from a notch filter for broadband light at normal incidence.
Figure 2B:
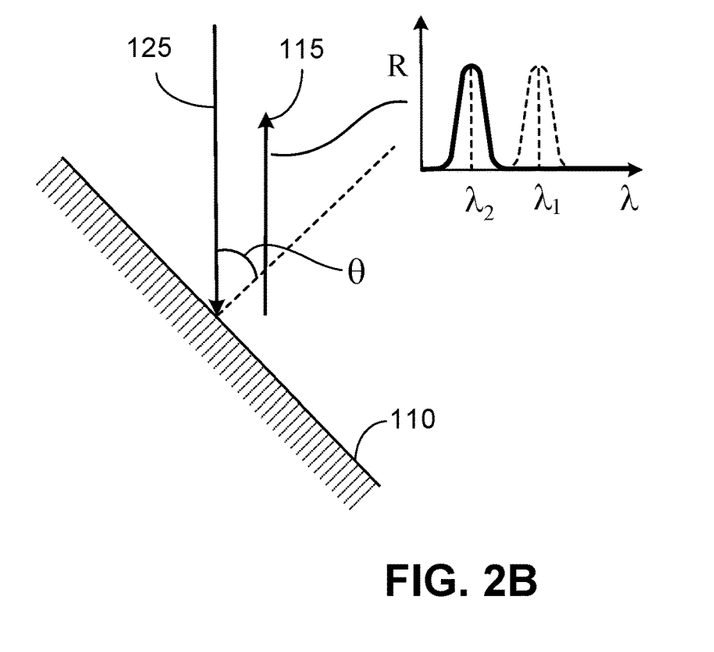
FIG. 2B depicts the spectral response from the notch filter for broadband light at a non-normal incident angle.

In the case of a mirror at normal incidence, the layers have a thickness of a quarter wavelength. However, for nonnormally incident light, the reflected light for which reflections are in phase shifts to shorter wavelengths, and the peak reflectance for the mirror shifts to shorter wavelengths. This principle is illustrated in FIGS. 2A and 2B. In particular, FIG. 2A illustrates a spectral response of a dielectric mirror when incident light 125 is normally incident on the surface of the mirror. Retroreflected light 115 propagates parallel to but in opposite direction to incident light 125.

The inset on the left shows a plot of spectral intensity on the y-axis as a function of wavelength on the x-axis for a spectral range of interest. This plot illustrates broadband illumination across a relevant spectral range.

The plot inset on the right in FIG. 2A illustrates the spectrum of the retroreflected light 115, which is characterized by a narrow peak centered on a wavelength $\lambda_1$. The peak wavelength corresponds to the wavelength for which the layers of the dielectric mirror satisfy the quarter wave thickness condition.

FIG. 2B shows the spectral response characteristics for light incident on the filter surface at a non-normal angle, θ. Here, the incident spectrum is the same as the incident spectrum shown in FIG. 2A. However, due to the non-normal incidence, the central wavelength of the band of reflected light shifts to a shorter wavelength, $\lambda_2$. Generally, the higher the incident angle of light 125, the lower the wavelength $\lambda_2$. In general, for dielectric mirrors, the width of the reflectance peak generally depends on the refractive index mismatch between the layers and the number of layers. The greater the number of layers, the greater the amount of variation in layer thickness, and/or the higher the index mismatch between, the broader the reflection peak.

Thus, by spectral analysis of the retroreflected light to determine the central wavelength of the filter's reflection peak, electronic processing module 130 determines information about the pose of retroreflector module 110.

While the foregoing example refers to a dielectric mirror that reflects a characteristic wavelength band of light, other optical filters that use thin film interference can also be used. For example, an interference filter that selectively passes, rather than reflects, a narrow wavelength band (or bands) may be used. By virtue of the same interference effects described above, the passbands shift to shorter wavelengths as the angle of incidence on the dielectric layers increases.

Thin film Interference filters are commonly manufactured using thin-film deposition methods. Common techniques are physical vapor deposition (which includes evaporative deposition and ion beam assisted deposition), chemical vapor deposition, ion beam deposition, molecular beam epitaxy, and sputter deposition. Common materials are magnesium fluoride, silicon dioxide, tantalum pentoxide, zinc sulfide, and titanium dioxide. Alternatively, interference filters can also be formed holographically, by exposing a light curable polymer to an interference pattern, for example.

Distributed Bragg reflectors (DBRs) can be used. For example, in some embodiments, the optical filter is formed from a DBR that includes a defect (e.g., a layer with twice the thickness of adjacent layers). Such DBRs can exhibit broadband reflection with a narrow passband.

Moreover, alternatives to filters based on thin film structure can also be used. In general, any optical filter that functions based on a Bragg reflection will demonstrate a shift in peak reflection wavelength as the angle of incidence with respect to the Bragg layers increases. Accordingly, any optical filters that utilize Bragg reflection can be used. An example includes cholesteric liquid crystal filters, which feature a chiral liquid crystal material which, at a corresponding wavelength, Bragg reflects light of one circular polarization state while transmitting the orthogonal state.

Other types of filter are also possible. For instance, certain diffraction gratings can be used which have a diffraction maximum (e.g., zero order or higher order) at different wavelengths depending on the angle of incidence.

As noted above, retroreflector module 110 includes a retroreflecting optical element. In general, a variety of different retroreflecting optical elements can be used. For example, in some embodiments, retroreflector module 110 includes a cube corner retroreflector. A cube corner generally features three mutually perpendicular faces which will each reflect an incident ray of light to redirect the light back along the path from which it came.

Figure 3:
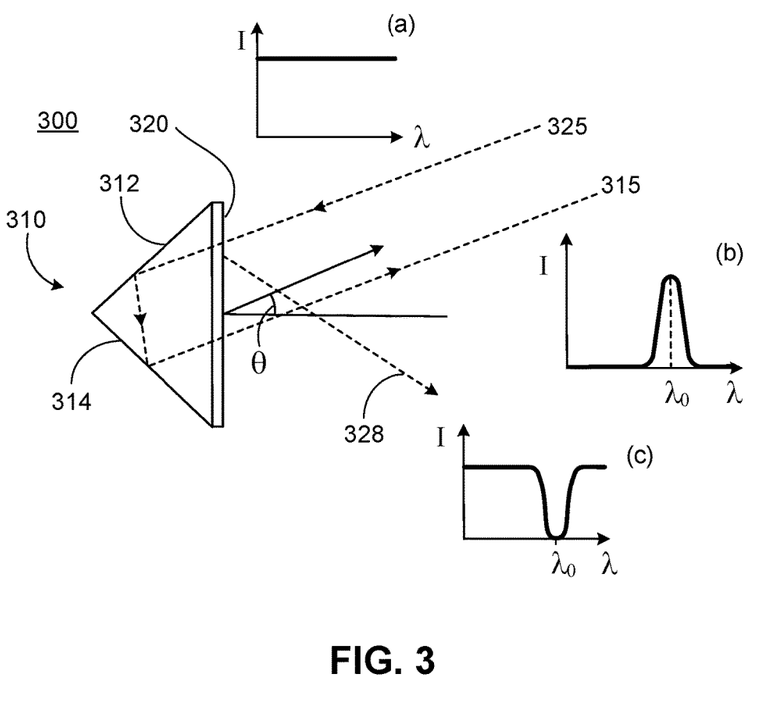
FIG. 3 is a schematic diagram of an embodiment of a retroreflective module featuring a cube corner retroreflector with a spectral filter.

An exemplary implementation is shown in FIG. 3, which depicts a cube corner prism 310. For simplicity, the cube corner is depicted as a two dimensional right angled prism with two cube faces 312 and 314 and an aperture face 320, on which an interference bandpass filter is provided. During operation, broadband light 325 is incident on aperture face 320 at an incident angle θ. The spectrum of broadband light 325 is depicted in inset (a). The bandpass filter reflects light 328 at a narrow band of wavelengths centered on wavelength $\lambda_\theta$, as depicted in inset (c). As noted previously, the precise wavelength $\lambda_\theta$ varies depending on the angle of incidence, θ.

As shown, the light transmitted by the bandpass filter reflects first from face 312 and then from face 314 before exiting through aperture face 320 as retroreflected light 315 parallel to the direction of light 325. It bears repeating that in practice, the light will be reflected from a third face in addition to faces 312 and 314. The spectrum of retroreflected light 315 consists of a narrow peak centered on wavelength $\lambda_0$, as depicted in inset (b).

For normally incident light, light 328 reflected from the bandpass filter will overlap with the retroreflected light. In this case, the spectrum of the light at the detector will be the same as the emitted spectrum, and pose information corresponding to normal incidence can be interpreted by the electronic processing module.

Figure 4:
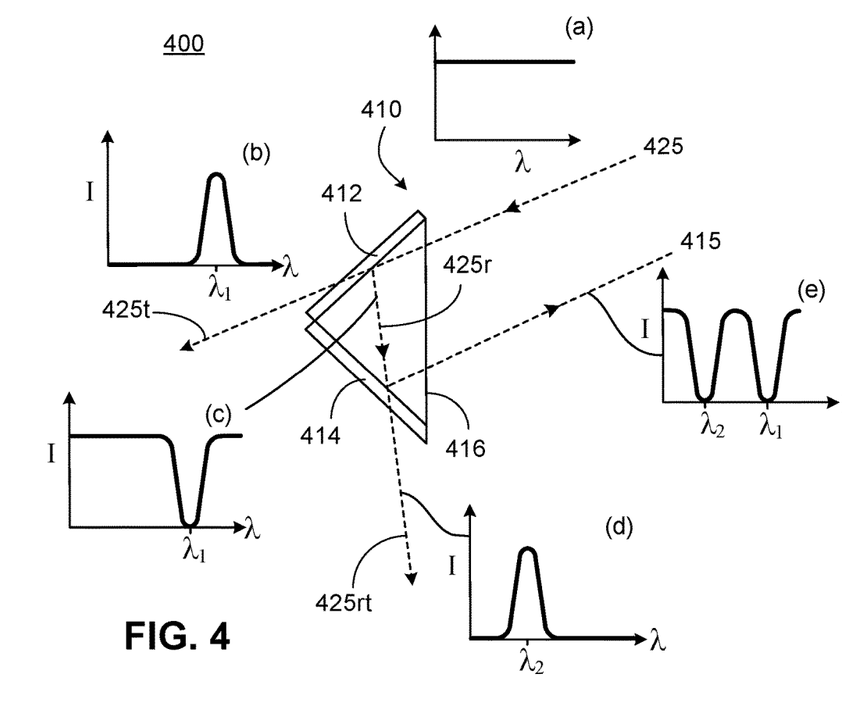
FIG. 4 is a schematic diagram of another embodiment of a retroreflective module featuring a cube corner retroreflector with multiple spectral filters.

While cube corner prism 310 features an optical filter (bandpass filter 320) on its aperture face, other configurations are also possible. For example, in some embodiments, a cube corner retroreflector can include interference filters on each of the cube faces. Each filter can have the same spectral response or each can be different. In implementations where each filter has a different response, it is possible to determine pose information in multiple degrees of freedom based on the spectral response of each of the filters. This is illustrated in FIG. 4, which depicts a cube corner 410 (again in two dimensions, for simplicity) that includes optical filter coatings 412 and 414 on the two cube faces. As illustrated, light ray 425 is incident on the cube corner at face 416, first reflects from a face that includes filter 412 (ray 425r) and then from a face that includes filter 414 before exiting the cube corner as light ray 415. Filter 412 emits a portion of the incident light, shown as light ray 425t. Similarly, filter 414 transmits a portion of the incident light, shown as ray 425rt. Optionally, the back surfaces of each optical filter coating can be an absorbing layer so that light transmitted by each filter is absorbed.

Incident light ray 425 is broadband light, having a uniform spectral intensity across the wavelength bad of interest, as shown by the intensity spectrum depicted by inset (a).

As depicted, filter 412 is a notch filter which transmits a narrow spectral band centered on a first wavelength $\lambda_1$. The intensity spectra of the light transmitted and reflected by filter 412 are depicted by insets (b) and (c), respectively. Accordingly, the wavelength $\lambda_1$ is indicative of the angle of incidence of light ray 425 on filter 412. The lower the value of $\lambda_1$, the larger the angle of incidence at filter 412.

Filter 414 is a notch filter which transmits a narrow spectral band centered on a second wavelength, $\lambda_2$, which is, by design, a shorter wavelength than $\lambda_1$. Because the value of $\lambda_2$ varies depending on the angle of incidence at filter 414, the value of $\lambda_2$ in the reflected light is indicative of the orientation of this surface. The intensity spectrum of light transmitted by filter 414, which includes a narrow peak centered at $\lambda_2$, is depicted by inset (d). The intensity spectrum of the retroreflected light, which includes notches at $\lambda_1$ and $\lambda_2$, is depicted by inset (e).

Of course, the third face of the cube corner can include a third filter for transmitting a third wavelength band at yet another wavelength, thereby providing pose information of a third degree of freedom. Moreover, while the foregoing filters transmit a narrow peak, in other embodiments each filter can be configured to reflect a narrow peak instead.

Generally, cube corner retroreflectors can be provided as prisms which reflect light by total internal reflection at the cube faces, or by three reflecting surfaces (e.g., metallic reflecting surfaces or dielectric mirrors). In embodiments where reflecting surfaces are used, the reflectors can be provided on the cube faces of a cube corner prism or three planar reflectors arranged orthogonally to each other. Furthermore, while the foregoing implementations feature single cube corner retroreflectors, in some embodiments the retroreflector module can include multiple cube corner retroreflectors, such as in the form of retroreflective sheeting (e.g., such as the retroreflective sheeting used for road signage).

Figure 5:
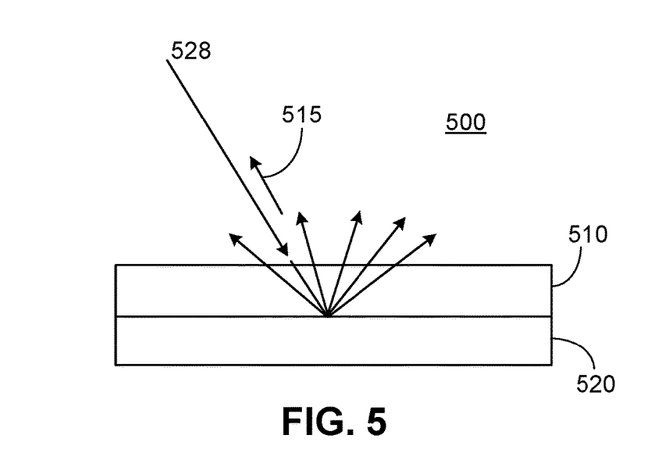
FIG. 5 is a schematic diagram of an embodiment of a retroreflector module that includes a backscattering layer.

While the foregoing examples feature cube corner retroreflectors, other optical elements that retroreflect light can also be used. For example, referring to FIG. 5, in some embodiments a retroreflector module 500 includes a diffuse reflector 520 which backscatters at least some incident light, along with an optical filter 525. Diffuse reflector 520 can operate by volume scattering and/or surface scattering. Volume scattering can be achieved, for example, using a layer that includes a continuous transparent material that includes a dispersion of scattering centers of another material having a different refractive index. For instance, volume scattering materials can include a dispersed phase material (e.g., a first polymer) within a different continuous phase material (e.g., a second polymer). In some embodiments, volume scattering can be achieved with a continuous phase material that includes voids (e.g., bubbles) of appropriate size for scattering the broadband light. Surface scattering material can include a white colored material with a roughened surface, for example.

Due to light scattering into a range of angles, the intensity of backscattered light of a diffuse reflector will generally be lower than for retroreflected light. Accordingly, systems utilizing diffuse reflectors may, in general, use higher intensity light sources and or higher sensitivity detectors than other applications.

Other retroreflecting optical elements can also be used. For example, spherical retroreflectors or phase-conjugate mirrors can be used. Elements using spherical retroreflectors may include, for example, a surface covered (e.g., close-packed) with spheres (e.g., glass or plastic) of appropriate size. An optical filter is disposed (e.g., laminated) over the spheres to encode light with pose information before the light is retroreflected by the spheres.

Figure 6:
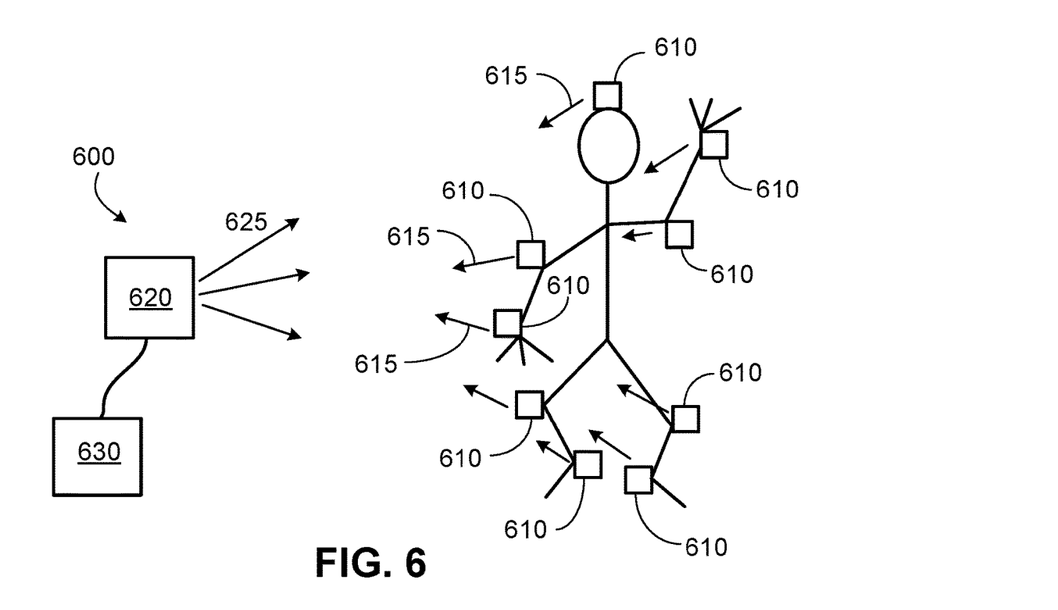
FIG. 6 is a schematic diagram of an embodiment of an optical tracking system featuring retroreflector modules.

In general, the foregoing retroflector modules and optical tracking system can be used in a variety of applications. For example, in some implementations, the optical tracking system can be used in motion tracking applications. Referring to FIG. 6, as an example, an optical tracking system 600 tracks multiple retroreflector modules 610 which are affixed to different parts of a user's body in order to continuously monitor the user's motion. As shown, the user has modules attached to each ankle, each knee, each wrist, each elbow, and the user's head. Of course, implementations can include as many modules as desired. System 600 also includes a source/detector module 620, which is connected to an electronic processing module 630.

During use, source/detector module 620 emits broadband light 625 toward the user and each retroreflector module 610 reflects light 615 back towards the source/detector module. Source/detector module 620 detects the retroreflected light and sends corresponding signals to electronic processing module 630 which determines the location and pose information about each retroreflector module 610.

In order for system 600 to distinguish one retroreflector module from another, each module can be configured with a different spectral filter so that each spectrally encodes retroreflected light with a unique signature. Alternatively, or additionally, modules can be distinguished based on the relative location of each module to each other. For example, modules attached to the user's ankles will remain a substantially fixed distance from the modules attached to the user's knees. Similarly, modules attached to the user's wrists will remain a substantially fixed distance from the modules affixed to the user's elbows. However, the distance between modules attached to a user's arms and modules attached the user's legs will vary as the user moves around.

Optical tracking systems for motion tracking such as shown in FIG. 6 can be used for motion capture applications, such as motion capture for video gaming, movie making, virtual reality, and/or athletic training.

Optical tracking systems can also be used in automation and control applications. For example, an optical tracking system can be used to facilitate automated docking of one object to another. For example, referring to FIG. 7, an optical tracking system 700 facilitates the automated docking of a plug 710 with a charging port 720. Plug 710 includes an affixed retroreflector module 715 and pins 714. Plug 710 is connected to actuated cabling 712.

Figure 7:
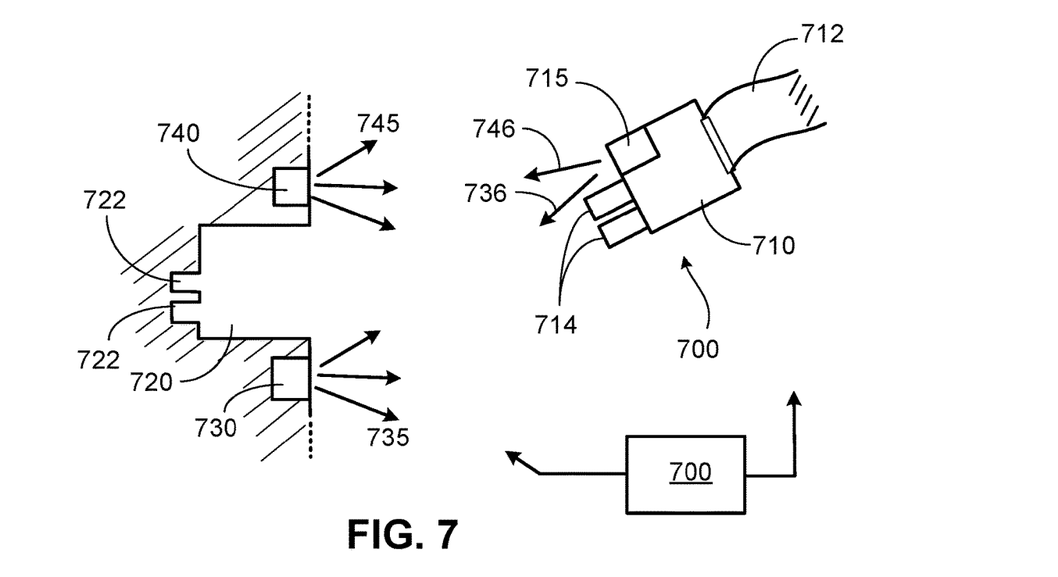
FIG. 7 is a schematic diagram of another embodiment of an optical tracking system featuring retroreflector modules.

Charging port 720 includes sockets 722 arranged to receive pins 714 when plug 710 is suitably oriented with respect to charging port 720, but not when the plug is not in proper alignment with the charging port. Source/detector modules 735 and 745 are positioned on opposite sides of charging port 720. Both plug 710 and charging port 720 are in communication with electronic processing module 701.

During operation, source/detector modules 735 and 745 emit broadband light 735 and 745, respectively. Retroreflector module 715 retroreflects light 736 and 746 back towards modules 730 and 745 respectively, providing information about the location of the plug with respect to the port and spectrally encoding the retroreflected light with information about the orientation of the plug. Modules 730 and 745 detect and spectrally resolve retroreflected light 736 and 746, respectively, and send signals containing information about the detected light to electronic processing module 701. Based on the signals, electronic processing module 701 determines information about the pose of plug 710 along with information about its location relative to charging port 720.

System 700 uses this information in a feedback loop to control actuation of plug 710 to guide the plug to dock with charging port 720. For example, system 700 can continuously or intermittently perform location and pose measurements as the actuator moves plug 710 towards charging port 720, making appropriate adjustments to the plug's orientation and trajectory to accurately guide the plug into the port.

The disclosed systems can also be used for homing applications, such as for precision landing of aircraft, especially unmanned aircraft. For example, a retroreflecting module can be used as a homing beacon for an unmanned aircraft when landing. By positioning the retroreflecting module at the landing strip, the aircraft can locate the module by using an onboard source/detector module. Pose information may be particularly important in such applications where the runway is unstable, such as when landing on an aircraft carrier. Using the pose information, the aircraft can anticipate its line of approach with respect to the runway as well as any tilting of the runway.

Some aspects of the systems described here can be implemented in digital electronic circuitry, or in computer software, firmware, or hardware, including the structures disclosed in this specification and their structural equivalents, or in combinations of one or more of them. For example, in some implementations, the electronic processing module 130 can be implemented using digital electronic circuitry, or in computer software, firmware, or hardware, or in combinations of one or more of them.

The term "electronic processing module" encompasses all kinds of apparatus, devices, and machines for processing data and/or control signal generation, including by way of example a programmable processor, a computer, a system on a chip, or multiple ones, or combinations, of the foregoing. The module can include special purpose logic circuitry, e.g., an FPGA (field programmable gate array) or an ASIC (application specific integrated circuit). The module can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The module and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes described above can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computing system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
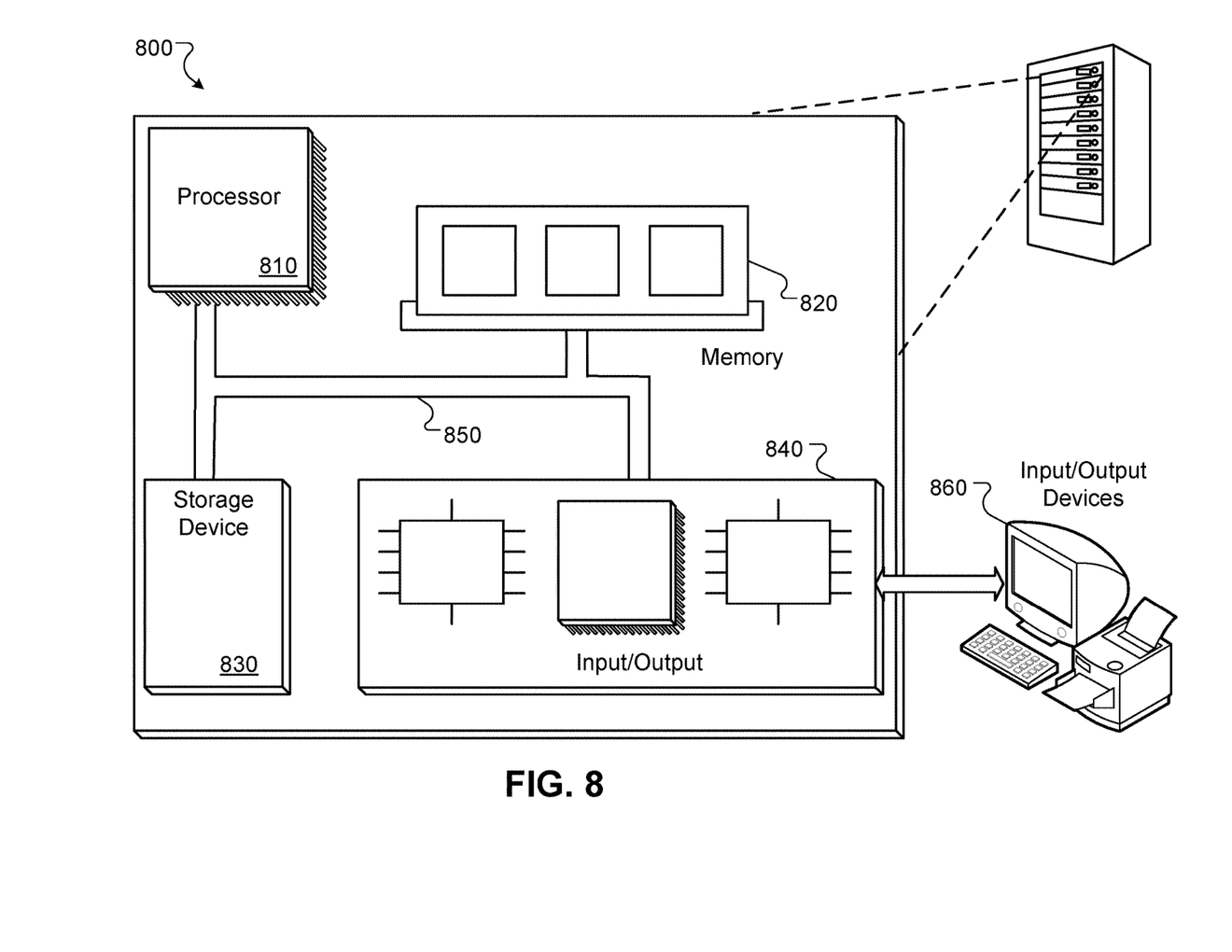
FIG. 8 is a schematic diagram of an electronic processing module.

FIG. 8 shows an example electronic processing module 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the module 800.

The input/output device 840 provides input/output operations for the module 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 860. In some implementations, mobile computing devices, mobile communication devices such as smart phones or tablet computers, and other devices can be used. A number of embodiments have been described. Nevertheless, it will be understood that various modifications may be made without departing from the spirit and scope of the invention. Accordingly, other embodiments are within the scope of the claims.

What is claimed is:

1. A system, comprising:
   a light source;
   a detector configured to spectrally resolve light across an operative wavelength range;
   a retroreflector module comprising a reflector and an optical filter integrated with the reflector, the reflector being configured to retroreflect at least some of incident light across the operative wavelength range,
   the optical filter being configured to filter light across the operative wavelength range, the optical filter having an angular-dependent optical characteristic for light across the operative wavelength range; and
   an electronic processing module in communication with the detector,
   wherein the system is configured so that during operation the light source directs broadband light towards the retroreflector module, the detector detects filtered retroreflected light from the retroreflection module, and the electronic processing module determines information about an orientation of the retroreflector module with respect to the detector based on the spectral content of the filtered retroreflected light.

2. The system of claim 1, wherein the electronic processing module is configured to determine information about the orientation of the retroreflector module based on a wavelength of peak or valley in the spectrum of the filtered retroreflected light.

3. The system of claim 1, wherein the information about the orientation of the retroreflector module comprises information about at least one orientational degree of freedom of the retroreflector module with respect to the detector.

4. The system of claim 1, wherein the electronic processing module is configured to determine information about the location of the retroreflector module with respect to the detector based on the filtered retroreflected light.

5. The system of claim 4, wherein the information about the location of the retroreflector module with respect to the detector comprises a direction of the retroreflector module with respect to the detector.

6. The system of claim 4, wherein the information about the location of the retroreflector module with respect to the detector comprises a distance of the retroreflector module with respect to the detector.

7. The system of claim 1, wherein the optical filter comprises an interference filter.

8. The system of claim 7, wherein the interference filter transmits a narrow band of the broadband light.

9. The system of claim 7, wherein the interference filter reflects a narrow band of the broadband light.

10. The system of claim 7, wherein the interference filter comprises a plurality of layers of dielectric materials where adjacent layers have differing indexes of refraction.

11. The system of claim 1, wherein the reflector is a cube corner retroreflector.

12. The system of claim 11, wherein the optical filter is integrated with the cube corner to substantially cover an aperture of the cube corner.

13. The system of claim 11, wherein the optical filter is integrated with the cube corner to form a reflective surface of the cube corner.

14. The system of claim 13, wherein the optical filter is a first optical filter and at least one additional optical filter is integrated with the cube corner to form a second reflective surface of the cube corner, the additional optical filter having different spectral characteristics than the first optical filter.

15. The system of claim 1, wherein the optical filter is a first optical filter, the retroreflector module comprises at least one additional optical filter integrated with the reflector and having a different spectral characteristic from the first optical filter, and the electronic processing module is configured to determine information about a first degree of freedom from the first optical filter and to determine information about a second degree of freedom, different from the first degree of freedom, based on the additional optical filter.

16. The system of claim 1, wherein the reflector is a diffuse reflector.

17. The system of claim 1, wherein the light source is a visible light source.

18. The system of claim 17, wherein the light source is a white light source.

19. The system of claim 1, further comprising one or more additional retroreflector modules each comprising a reflector and an optical filter integrated with the corresponding reflector, the reflector being configured to retroreflect at least some of incident light across the operative wavelength range, each of the one or more retroreflector modules comprising an optical filter configured to filter light across the operative wavelength range, each optical filter having an angular-dependent optical characteristic for light across the operative wavelength range, wherein each optical filter has a spectral filtering characteristic different from optical filters of the other retroreflector modules.

20. The system of claim 19, wherein the electronic processing module is configured to distinguish each retroreflector module based on the spectral filtering characteristic of each corresponding optical filter.

21. A method for determining pose information about a reflective object with respect to a frame of reference, the method comprising:
   illuminating the reflective object with broadband illumination;
   detecting retroreflected light from the reflective object in response to the illuminating, wherein the reflective object comprises an optical filter which spectrally encodes the retroreflected light with information about an orientation of the reflective information with respect to at least one degree of freedom in the frame of reference; and
   determining pose information relating to the at least one degree of information based on a spectrum of the detected retroreflected light.

22. The method of claim 21, wherein the optical filter spectrally encodes the retroreflected light by transmitting or reflecting a band of wavelengths that is a subset of spectrum of the broadband illumination.

23. The method of claim 22, wherein a peak wavelength of the band of wavelengths depends on an incidence angle of light on the optical filter and the pose information is determined based on a value of the peak wavelength.

* * * * *